United States Patent [19]

Chamberlain

[11] 4,016,947
[45] Apr. 12, 1977

[54] MEANS FOR SECURING AXLE TO FRAME
[75] Inventor: Richard W. Chamberlain, Aurora, Ill.
[73] Assignee: Caterpillar Tractor Co., Peoria, Ill.
[22] Filed: Dec. 1, 1975
[21] Appl. No.: 636,503
[52] U.S. Cl. .................. 180/88; 403/389; 301/125
[51] Int. Cl.² ........................ B60B 35/00
[58] Field of Search .......... 180/88, DIG. 1, DIG. 2; 280/80 R, 80 A, 29; 267/52; 403/387, 386, 389; 301/125, 134

[56] References Cited
UNITED STATES PATENTS

| 275,084 | 4/1883 | Seeley ................ 267/52 |
| 345,392 | 7/1886 | Neff .................. 267/52 |
| 427,357 | 5/1890 | Peck .................. 267/52 |
| 610,050 | 8/1898 | Hennessy ............. 301/125 |
| 1,283,803 | 11/1918 | Kirkham ............ 267/52 X |

Primary Examiner—Robert R. Song
Assistant Examiner—R. Schrecengost
Attorney, Agent, or Firm—Phillips, Moore, Weissenberger, Lempio & Majestic

[57] ABSTRACT

An axle housing defines extended portions which are positionable near and engageable with extensions defined by a bracket fixed relative to a vehicle frame. The respective extensions and extended portions are secured together by clamp structures interconnecting them.

9 Claims, 3 Drawing Figures

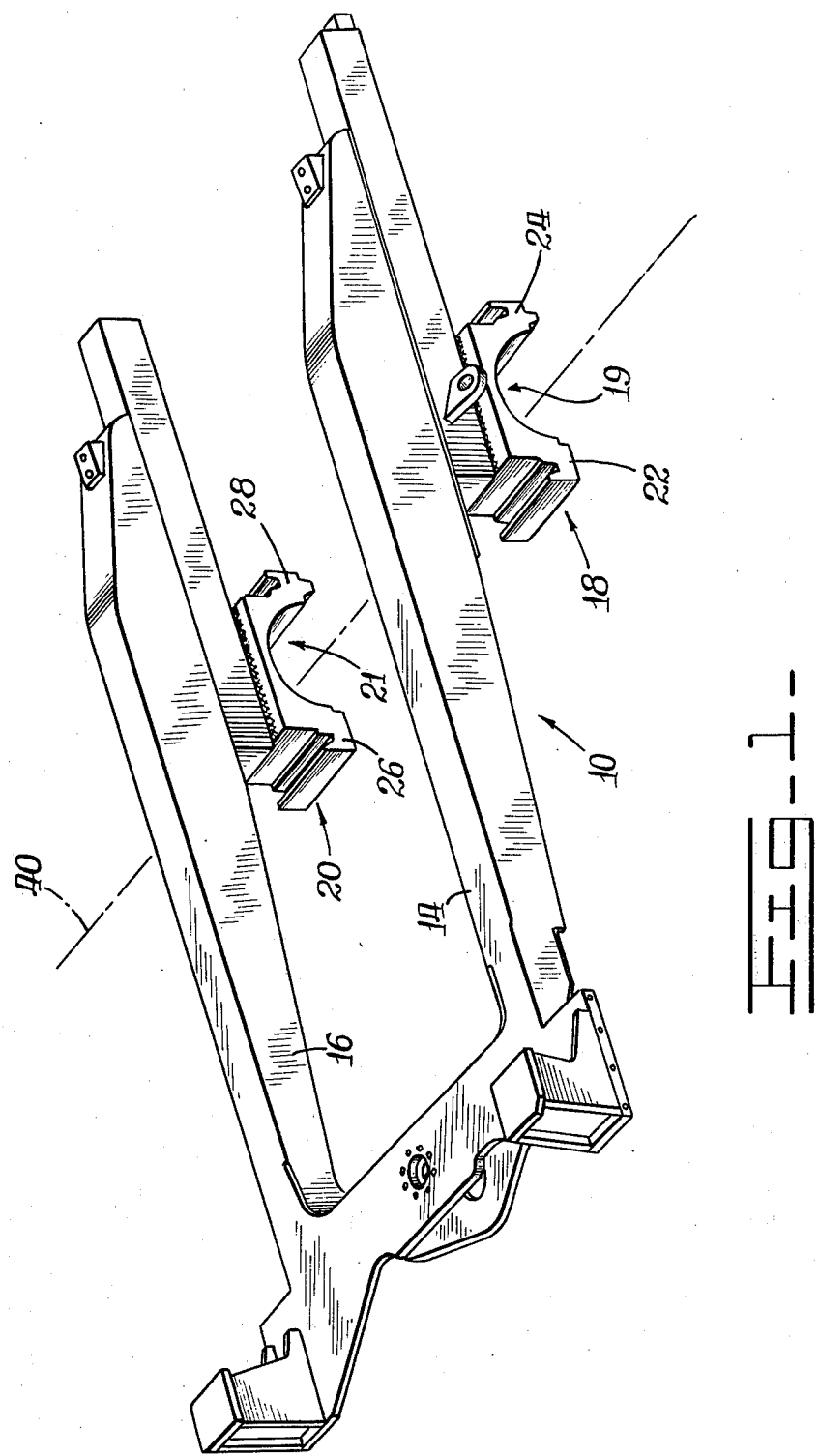
Fig—1

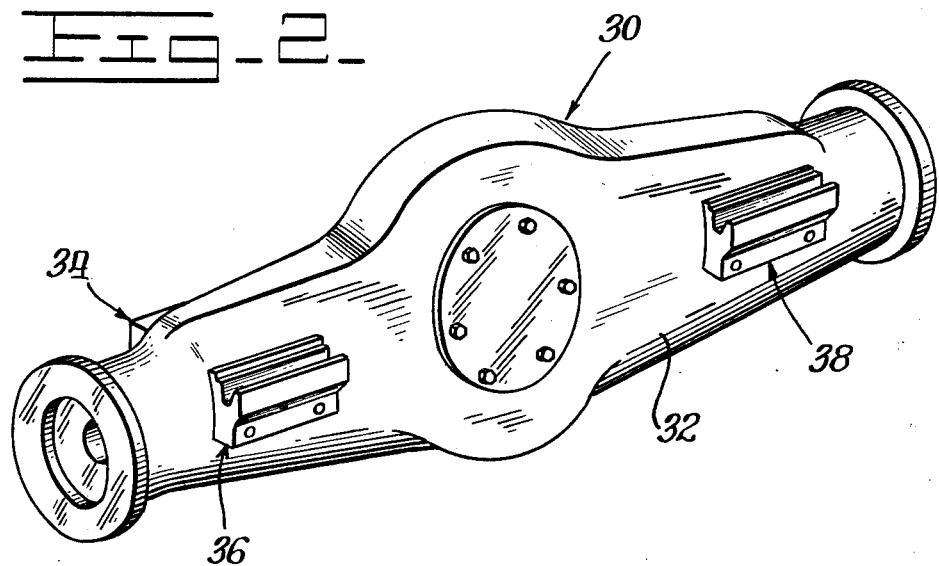
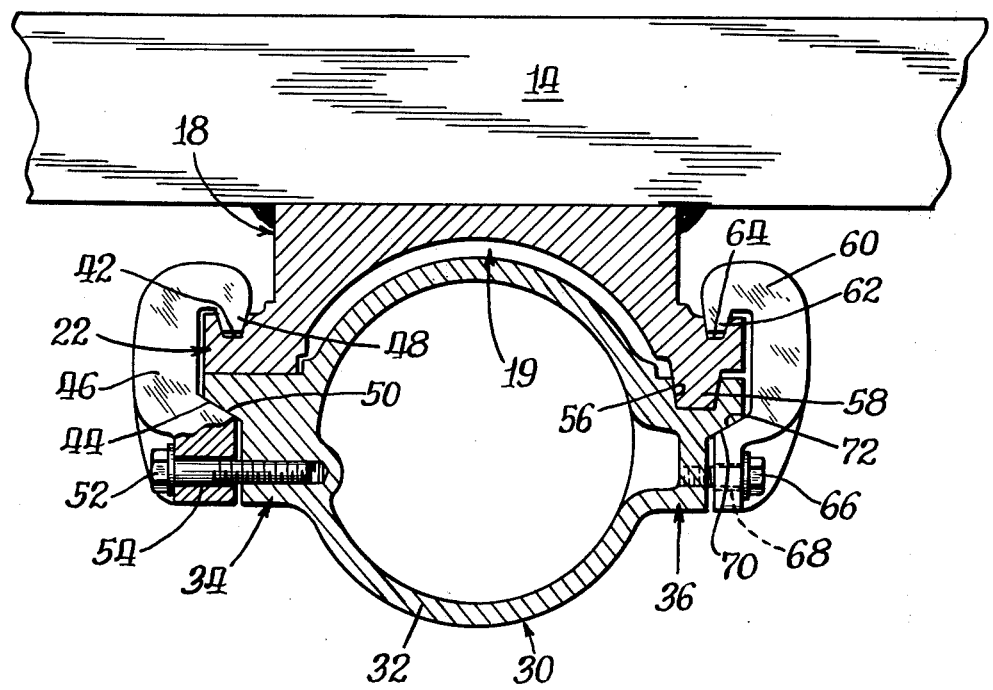

MEANS FOR SECURING AXLE TO FRAME

BACKGROUND OF THE INVENTION

This invention relates to means for securing one element relative to another, and more particularly, to apparatus for securing an axle housing relative to a frame of a vehicle.

In securing of the axle housing of a vehicle relative to the frame thereof, it will be understood that the securing means thereof must be capable of providing proper and effective mounting in a strong and highly efficient manner. Generally, in the past, a plate has been welded to each frame rail, with portions thereof extending laterally of such frame rail. Such laterally extending portions define apertures which may be brought into registry with corresponding tapped holes defined by a plate in turn welded to the axle housing. Cap screws are then used to secure the plates together, in turn securing the axle housing relative to the frame.

It has been found that, in a relatively large machine, a great number of large cap screws must be used, because the great shear stress resulting between the axle housing and frame must be borne by such cap screws. For example, in one particular machine, 32 cap screws 1¼ inch diameter must be used for effective mounting.

It will be understood that it is highly desirable to simplify a mounting structure of the type described, meanwhile also increasing the efficiency in carrying forces therein, and also in the efficiency in overall use thereof.

SUMMARY OF THE INVENTION

It is accordingly an object of this invention to provide means for mounting an axle housing relative to a frame of a vehicle which is extremely simple in design and effective in use.

It is a further object of this invention to provide means for mounting an axle housing relative to a frame of a vehicle which, while fulfilling the above object, provides for proper positioning of the axle housing relative to the frame upon application of such means thereto.

It is a still further object of this invention to provide means for mounting an axle housing relative to the frame of a vehicle which, while fulfilling the above objects, provides proper force for efficient mounting thereof.

Broadly stated, the apparatus for securing an axle housing relative to a frame comprises a bracket fixed relative to the frame. The axle housing defines first and second extended portions, positioned on either side thereof and engageable with first and second extensions of the bracket respectively. Clamp means are included for engaging and securing the first extension and first extended portion together. Further included are means for engaging and securing the second extension and second extended portion together.

BRIEF DESCRIPTION OF THE DRAWINGS

These and other objects of the invention will become apparent from a study of the following specification and drawings, in which:

FIG. 1 is a perspective view of a vehicle frame, incorporating the brackets of the invention;

FIG. 2 is a perspective view of an axle housing to be secured to the frame of FIG. 1, and including extended portions thereof in accordance with the invention; and FIG. 3 is a sectional view showing the axle housing mounted to the bracket in turn secured to the frame.

DESCRIPTION OF THE PREFERRED EMBODIMENT

Shown in FIG. 1 is the frame 10 of a vehicle (not shown). Such frame includes rails 14,16, to which are fixed brackets 18,20 respectively. Such brackets 18,20 are welded to the undersides of the rails 14,16, and the brackets 18,20 are of inverted generally U-shape. The bracket 18 defines first and second extensions 22,24, and the bracket 20 defines first and second extensions 26,28.

An axle housing 30 defines a main body 32, which is seatable to an extent in the recesses 19,21 defined by the brackets 18,20, transversely of the frame 10 of the vehicle. The axle housing 30 defines extended portions 34,26 positioned on either side thereof adjacent one end thereof, and extended portions (one shown at 38) similar to extended portions 34,36 adjacent the other end thereof. In general, in securing the axle housing 30 relative to the frame 10, the axle housing 30 is positioned so that the body 32 thereof extends transversely of the frame 10, with the longitudinal axis of the axle housing 30 being disposed along the line 40. Portions of the axle housing 30 seat to an extent in the recesses 19,21.

As the interactions of the bracket 18 and extended portions 34,36 are the same as the interactions of the bracket 20 and opposite extended portions, only one such association will be described in detail.

As shown in FIG. 3, the axle housing 30 is positioned to bring the extended portions 34,36 into engagement with the extensions 22,24 of the bracket 18 respectively. The extension 22 defines a groove 42 positioned transversely of the frame 10, and the extended portion 34 defines a surface 44 angled outwardly of the axle housing 30 and toward the extension 22. A clamp member 46 defines a tongue 48 which is positionable in the groove 42, with such tongue 48 being positioned and directed toward the extended portion 34, as shown in such FIG. 3. The clamp member 46 defines an angled surface 50 corresponding to the angled surface 44, and generally parallel thereto with the clamp member 46 positioned as shown in FIG. 3, and which is engageable with the angled surface 44.

A plurality of cap screws or bolts 52 are threadably engaged with tapped holes defined by the extended portion 34, and are disposed through slotted apertures 54 in the clamp member 46, at an end thereof opposite the tongued end.

Upon such positioning of the axle housing 30 relative to the bracket 18 described above, the extended portion 36 is brought adjacent to and in engagement with the extension 24. A channel 56 is defined by the extended portion 36, and a rib 58 is defined by the extension 24 so that upon such relative bringing together of the axle housing 30 and bracket 18, the rib 58 is seatable in the channel 56 to position the extension 24 relative to the extended portion 36. A clamp member 60 generally similar to clamp member 46, defines a tongue 62 which may be brought into position into a groove 64 defined by the extension 24, such tongue 62 being positioned and extending toward the extended portion 36. A plurality of cap screws or bolts 66 are disposed through slotted apertures 68 provided in the clamp member 60 adjacent the end thereof opposite the tongue 62 defined thereby, such bolts 66 being in threaded engagement with tapped holes defined by the extended portion 36.

The extended portion 36 defines a surface 70 angled outwardly of the axle housing 30 and toward the extension 24, such angled surface 70 being engageable by a correspondingly angled surface 72 defined by the clamp member 60, such angled surfaces 70,72 being generally parallel with the parts positioned as shown in FIG. 3.

Upon tightening of the bolts 52, it will be seen that the clamp member 46 acts to engage and secure the extension 22 and extended portion 34 together. Likewise, the clamp member 60, upon tightening of the bolts 66, acts to engage and secure the extension 24 and extended portion 36 together. The rotation of the bolts 52 acts on the clamp member 46 to bring the angled surfaces 44,50 together so that upon rotation of the bolts 52 the tongue 48 is urged to seat further into the groove 42, so that in turn the tongue 48 and angled surface 50 act to provide extremely secure positioning of the axle housing 30 relative to the bracket 18 and thus relative to the frame 10. Similarly, the tongue 62 and angled surfaces 70,72 act together upon tightening of the bolts 66 to bring the extended portion 36 and extension 24 together in a highly secure manner.

Through such particular structure, it will be seen that the mounting means disclosed provides proper alignment of and positioning of the axle housing 30, and thus the axle, relative to the frame 10. This is to be compared with the prior art system described above, wherein the frame and axle housing must be positioned relative to each other to bring the apertures described above into proper registry.

It will also be seen that the structure is extremely simple, requiring a much smaller number of bolts, which may themselves be smaller in size.

What is claimed is:

1. Apparatus for securing an axle housing relative to a frame, comprising:
    a bracket fixed relative to the frame;
    said axle housing defining first and second extended portions, positioned on either side thereof and engageable with first and second extensions of the bracket respectively;
    clamp means for engaging and securing the first extension and first extended portion together; and
    means for engaging and securing the second extension and second extended portion together.

2. The apparatus of claim 1 wherein said clamp means comprises a clamp member defining a tongue positionable in a groove defined by one of said first extension and first extended portion, said tongue being positioned toward the other of the first extension and first extended portion, and means for securing the clamp member to the other of said first extension and first extended portion.

3. The apparatus of claim 2 wherein the other of the first extension and first extended portion defines a surface angled outwardly and toward the one of the first extension and first extended portion, engageable by a correspondingly angled surface defined by the clamp member, and wherein the means for securing the clamp member to the other of said first extension and first extended portion comprise a bolt member threadably engaged with the other of said first extension and first extended portion and disposed through an aperture in the clamp member, the rotation of the bolt member acting on the clamp member to bring the angled surfaces together so that upon said rotation of the bolt member the tongue is urged to seat further into the groove.

4. The apparatus of claim 3 wherein the groove is defined by the first extension, and the angled surface defined by the other of the first extension and first extended portion is defined by the first extended portion, and wherein the bolt member is threadably engaged with the first extended portion.

5. The apparatus of claim 3 and further comprising means for positioning the second extension relative to the second extended portion.

6. The apparatus of claim 5 wherein said means for positioning the second extension relative to the second extended portion comprise a channel defined by one of said second extension and second extended portion, and a rib defined by the other of said second extension and second extended portion, and seatable in said channel.

7. The apparatus of claim 6 wherein said second extension defines said rib, and said second extended portion defines said channel.

8. The apparatus of claim 1 wherein the means for engaging and securing the second extension and second extended portion together comprise clamp means.

9. The apparatus of claim 3 wherein the means for engaging and securing the second extension and second extended portion together comprise clamp means.

* * * * *